Dec. 7, 1971  E. BOBARD  3,625,072
TRANSMISSION AND SPEED-VARIATION DEVICE
APPLICABLE TO TRACTORS FOR EXAMPLE
Filed Sept. 17, 1969  5 Sheets-Sheet 1
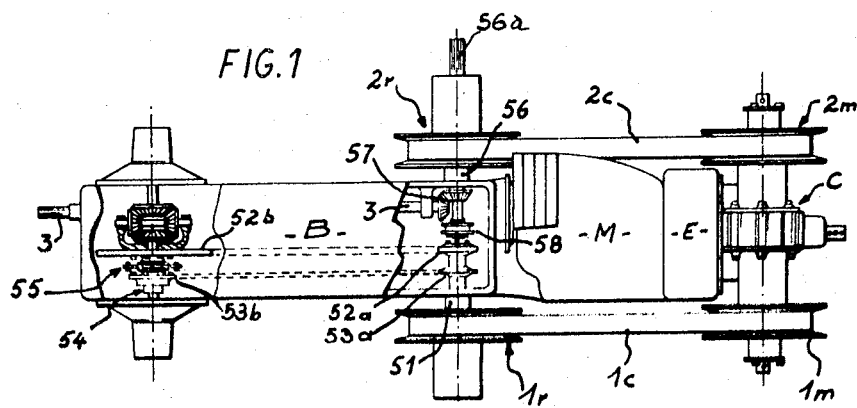
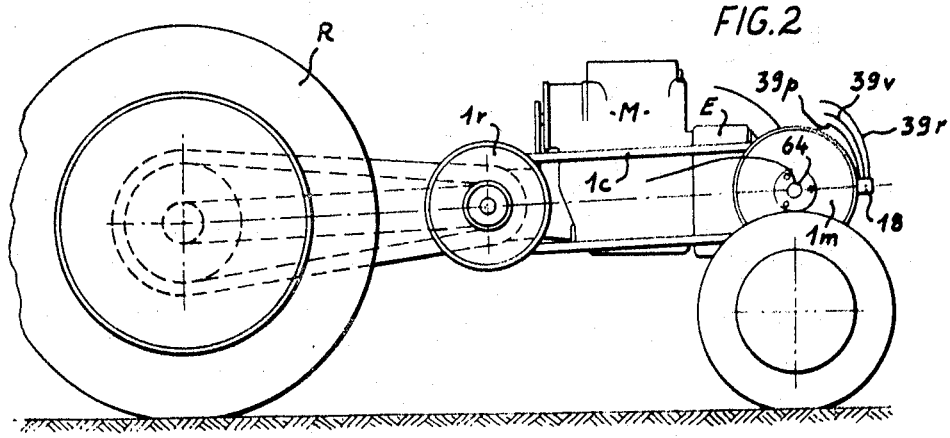
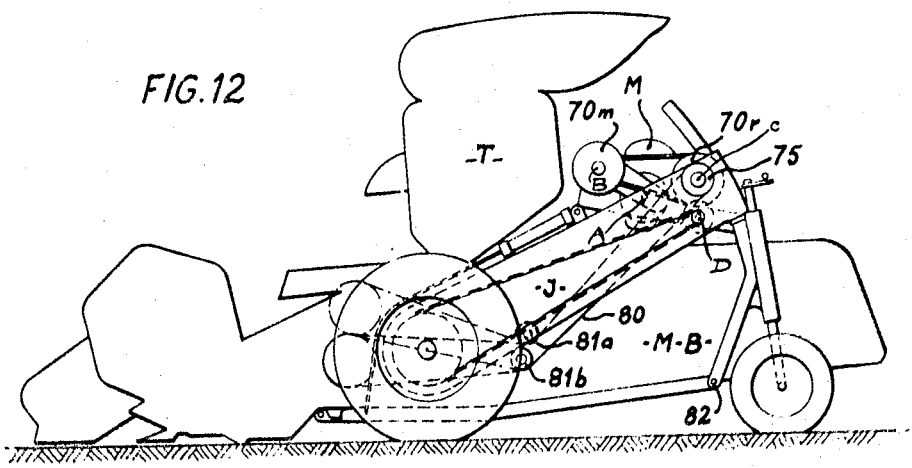

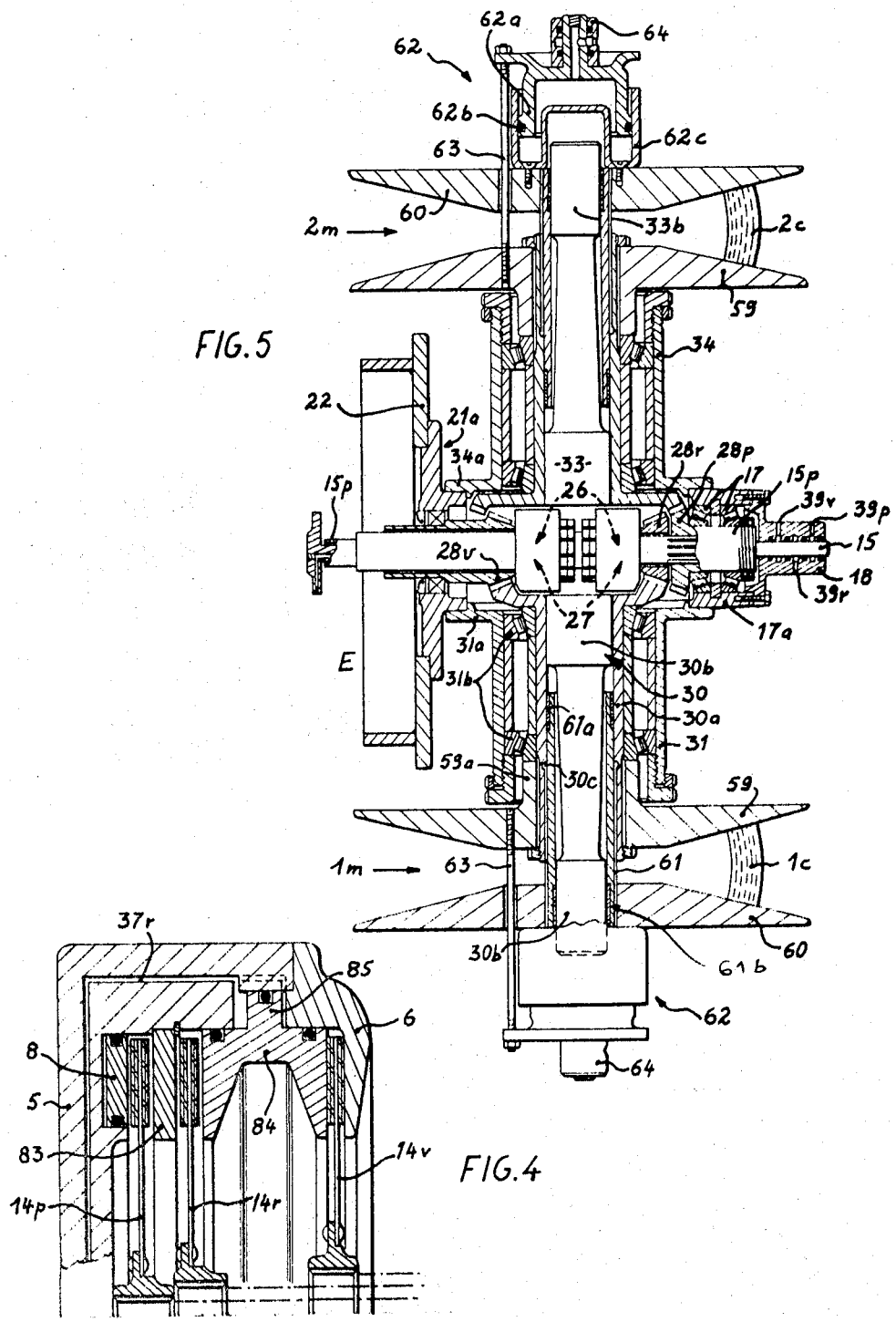

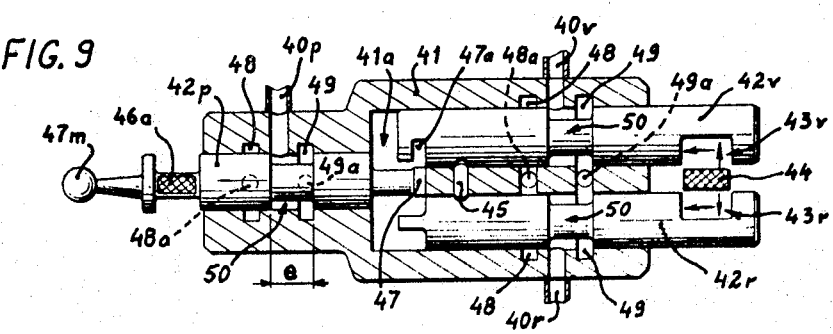
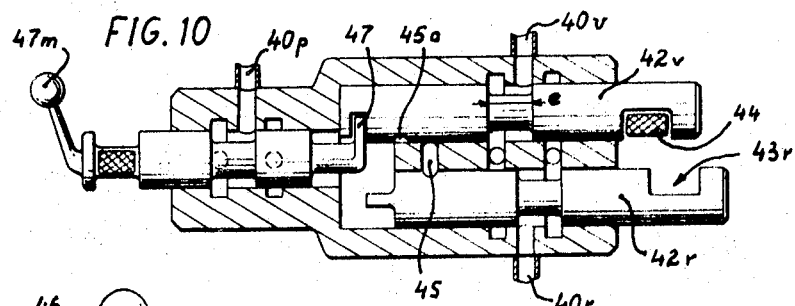
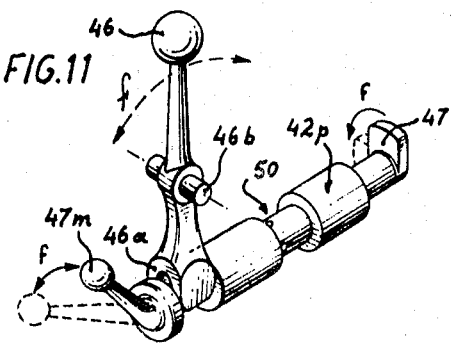
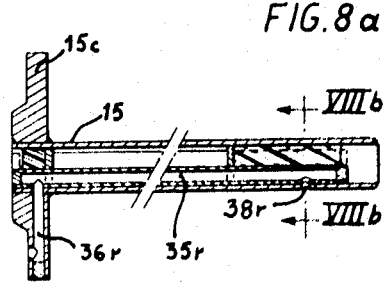
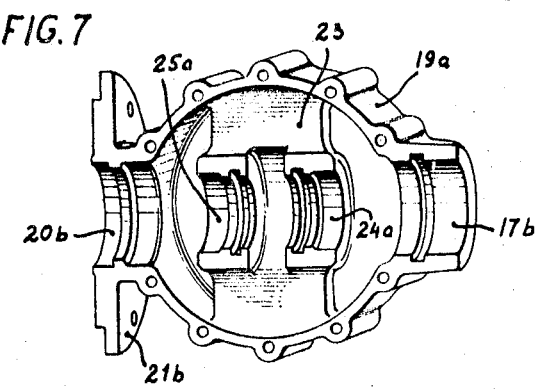

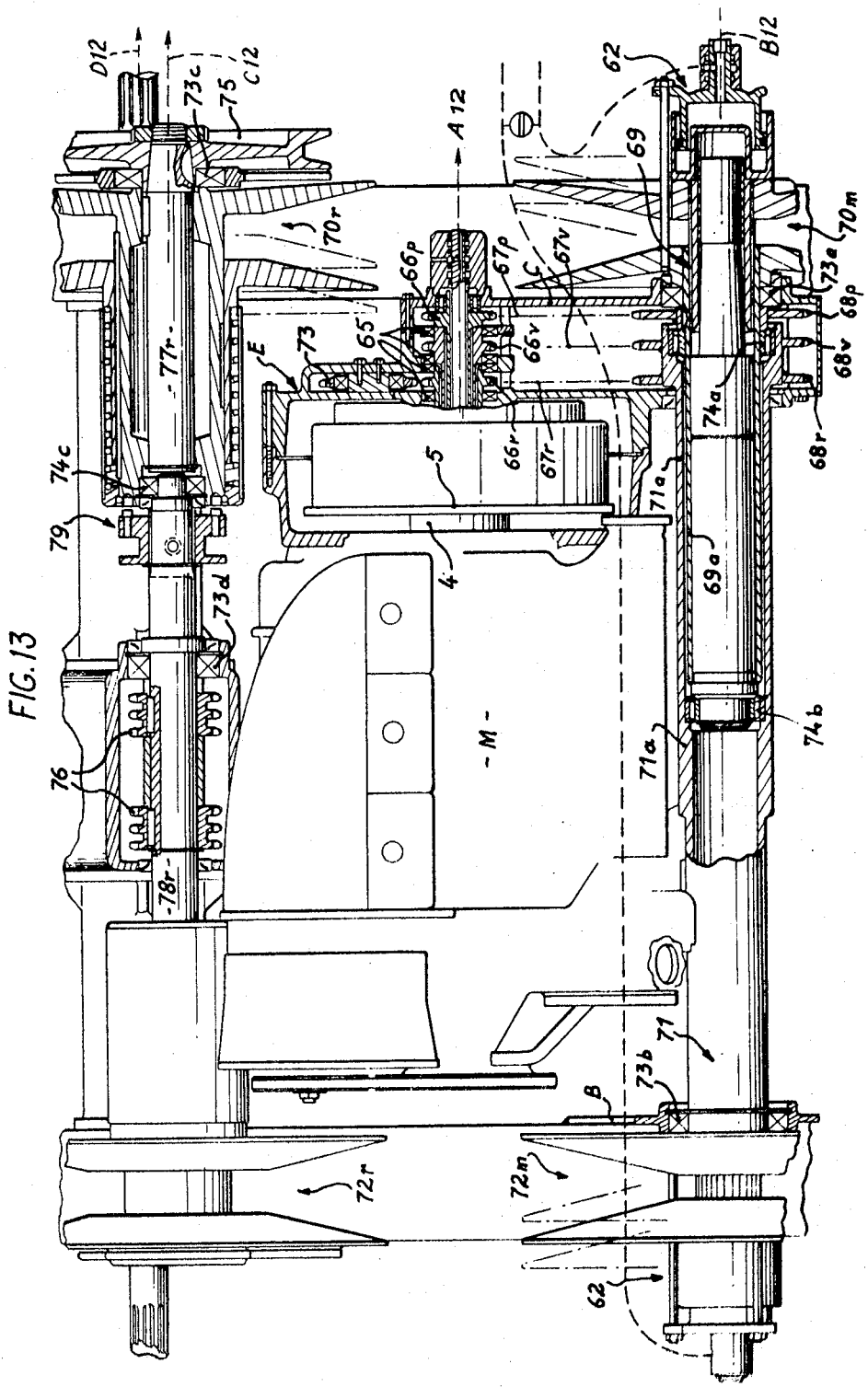

United States Patent Office 3,625,072
Patented Dec. 7, 1971

3,625,072
TRANSMISSION AND SPEED-VARIATION DEVICE APPLICABLE TO TRACTORS FOR EXAMPLE
Emile Bobard, 17 Rue de Reon, Beaune,
Cote d'Or, France
Filed Sept. 17, 1969, Ser. No. 858,606
Claims priority, application France, Sept. 20, 1968,
167,073; Sept. 27, 1968, 167,929
Int. Cl. F16d 21/06, 25/063; F16h 55/56
U.S. Cl. 74—15.4                                23 Claims

ABSTRACT OF THE DISCLOSURE

The present disclosure pertains to a transmission and speed variation device for an automotive vehicle, such as a harvester combine or tractor for driving the vehicle both in forward and reverse directions at various speeds in both directions. The device is capable of engaging at will, independently of one another, at least two driven shafts with a driving shaft and includes a speed changing means coupled to at least one of the driven shafts and means for axial clamping of conventional clutch plates.

---

The invention relates to an improved transmission and speed variation device intended to equip, more particularly, an automotive vehicle intended to carry and to drive, both in forward and reverse motion, a mechanism or a machine.

It is known that difficulties arise to achieve, from a conventional tractor provided with usual power take-off means, recoverable tractor automotive machines such as, for example, combine harvesters.

Indeed, the standard gear boxes mounted on such tractors effect, in forward motion, only a limited number of speed stages and, in reverse motion, one or, at most, two speed stages and cannot, accordingly, conform to the utilization requirements of the automotive machines made from such tractors which have to operate driving wheels forward.

Moreover, the usual dependence of the power take-off shaft of a standard tractor upon its driving shaft does not make it possible to harmonize easily the driving speed of such a machine with random variations of working loads.

On the other hand, there had indeed been proposed tractors equipped with engagement and speed-change means, of hydraulic type, which may supply a continuous range of speeds in either direction of movement of such machines, but these devices are particularly costly and their power output is relatively reduced.

The present invention aims at eliminating these drawbacks.

It is an object of this invention to provide a device for the transmission of the power of an engine to a system of driven shafts, notably those of the driving wheels and of the power takeoff of a self-propelled vehicle. Such device consists of a set of annular jaws for the axial clamping of friction clutch discs, a set of tubular coaxial shafts provided with clutch discs cooperating with the jaws and with transmission means on at least two driven shafts to ensure the clutching of these shafts on a drive shaft; and means for reversing the rotation of at least one of the driven shafts.

According to another feature of the invention, such drive shaft is coupled with speed change means.

In a preferred form of the invention, the speed change means coupled to a driven shaft includes a pair of regulatable grooved pulleys, one being driven, the other driving, and a belt suitably engaged with these pulleys, means being provided for ensuring the adjusting of the groove of one of the pulleys and to return to a predetermined position of the groove of the other pulley.

Such belt and pulley devices are perfectly suited to the conditions of use of agricultural machines for they insure a continuous range of speeds and their employment, under severe conditions of use, has confirmed the satisfactory output and the strength of such belt and pulley means.

In addition, the pulleys and the belt of a speed variation device equipping such a transmission device are, advantageously, arranged along a plane parallel with one of the sides of a motor position. Thus, the pulleys and the belts of the two speed-changers, respectively coupled to the two driven shafts of this transmission device, may be mounted around the emplacement of a motor, which makes it possible to achieve a compact transmission device.

The four shafts of such pulleys may be grouped, two by two, along two lines of shafts advantageously disposed parallel with the transversal sides or the longitudinal sides of a motor emplacement to form two alternatives presenting a framing suited, respectively, to the equipment of an agricultural tractor of standard type or of a carrier tractor with raised chassis platform.

Moreover, it will be realized that it is possible to associate to a driving shaft, by means of a support such as a flange integral with the latter, as many sets of jaws for clutch friction discs as it is possible to mount coaxially, the ones into the others, tubular shafts integral with those disc.

Another object of the present invention is to provide coupling means for the shafts of the pair of driven pulleys, said shafts being disposed coaxially on the same side of the engine emplacement. Such means enables the transmission of all the power of the motor either to the wheels of the vehicle or to the power takeoff of the motor; such a transmission may be effected in conditions of overpower or of greater demultiplication.

Other features and advantages will be revealed from the ensuring description on the basis of the attached drawings which, description and drawings, are given only for the sake of non limitative example.

On the said drawings,

FIGS. 1 and 2 represent, in plan view and side elevation respectively, the chassis of a standard tractor equipped with a transmission device in conformity with the invention.

FIG. 4 represents in partly exploded axial section an alternative of the clutch device of FIG. 3.

FIG. 5 represents in axial and horizontal view, means of kinetic transmission of the device of FIGS. 1 and 2.

FIG. 7 represents, in perspective view, a part of some of the transmission means of FIG. 5.

FIGS. 8a, 8b represent, respectively in axial and transversal view, another part of the transmission means of FIG. 5.

FIGS. 9 and 10 represent, diagrammatically in axial section, a slide-valve gear permitting of the control, by means of a pressurized fluid, of the clutch device of FIGS. 3 and 4.

FIG. 11 represents, in perspective, a control lever of one of the slides of the gear of FIGS. 9 and 10.

FIG. 12 represents, diagrammatically in side elevation, an automotive vehicle having a raised platform chassis on wheel legs and equipped with a transmission device in accordance with the invention.

FIG. 13 shows in cross-section, along the broken line A, B, C, D, E of FIG. 12, the arrangement of this figure.

Figure 3:
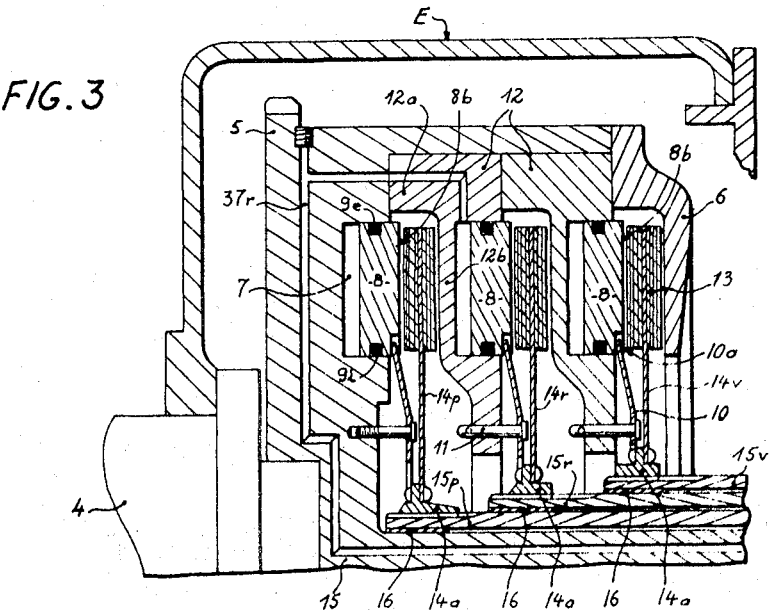
FIG. 3 represents, in axial section, on a larger scale, a clutch device equipping the transmission device of FIGS. 1 and 2.

On FIG. 1 there may be seen an internal combustion engine M coupled, as well be indicated below, with a clutch device housed in a housing E to drive in rotation, by means of a kinetic transmission system, mounted in a casing C, two shafts respectively engaged in the hubs of the driving pulleys 1m, 2m, of two speed variators with belt and adjustable grooved pulleys. The driven pulley 1r corresponding to the pulley 1m is associated by kinetic devices to a standard differential assembly of two driving half-shafts housed in a chassis B of a standard tractor and the driven pulley 2r, corresponding to the pulley 2m, is associated with power take-off means, particularly a shaft 3, to which reference will again be made later.

The shaft 4 of the motor M is provided (FIG. 3), in standard manner, with an inertia flywheel 5 which has a cylidrical housing partly closed by a crown 6.

The bottom of this housing constitutes a flange on the inner face of which there is provided, coaxially with the shaft 4 and in its medium section, an annular groove 7 which has a rectangular radial section.

A ring 8 of a shape and dimensions similar to those of groove 7 is engaged with soft friction in the latter; the external and internal cylindrical faces of this ring 8 have grooves for mounting tore joints 9e and 9i to constitute in that way an annular hydraulic jack to which reference will again be made later.

Furthermore, ring 8 has a groove 10a which is opened on its free side and on its inner cylindrical face to constitute, respectively, a radial face for support and a side face for retaining the outermost edge of a washer 10 the external portion of which is in the shape of a truncated cone; this washer being made in resilient metal and secured by dowels 11 to the flange of the flywheel 5 to constitute a return spring for the piston 8 for movement towards the bottom of its cylinder 7.

Moreover, an assembly of two superimposed crowns 12, identical with each other, is mounted coaxially with the shaft 4 by standard means such as bolts (not visible on this figure) onto the flange of flywheel 5. The central part of the face of each crown 12, opposite the flange of the flywheel 5, is arranged as a chamber 7 which is equipped with a piston 8 with a return device 10 to constitute an annular jack identical with that described above, and the outermost part of its opposite face, turned towards the flange of the flywheel has a protruding rib 12a in the axial direction to form a bearing and assembly face on the face of the flywheel shaft 5 or on the other face of the adjacent crown.

Each rib 12a provides, through its dimension in the axial direction and at the diameter of its internal face, an adequate gap for a free rotation of a standard friction lining 13, and it will be observed that crown 6 provides an identical gap. Moreover, for each crown 12 and for the crown 6, the radial face 12b situated opposite a piston 8 is perfectly plane and it will be appreciated that each of those faces 12b and the free face 8b of the corresponding piston 8 constitute two clamping jaws for a linig 13.

Moreover, three linings 13 coresponding to those three sets of jaws are secured, in traditional manner, to discs 14p, 14r, 14v respectively mounted on ferrules 14a integral with tubular elements 15p, 15r, 15v which have, each one of them, diameters suited to their coaxial mounting one inside the other, and to their relative rotation.

An element equipped with ferrule 14a forcibly inserted into the outermost part of the bore 16 of each of these shafts; the nature and the internal dimensions of each element being such as to permit free rotation of the tubular shaft around each element.

In addition, a shaft 15 (to which reference will again be made) is mounted on the flange of flywheel 5 and is threaded into the bore of the tubular shaft 15p. The other end of this shaft 15p is supported by a bearing (FIG. 5) having two taper roller bearings 17 arranged head to head, one in relation to the other, to constitute, in addition, an abutment against the force which may be applied axially on said shaft.

The external ball races of these bearings 17 are mounted, in usual manner, in a tubular casing 17a consisting of two shells integral with elements of the casing C mentioned above; this casing 17a being sealed, in tight manner, by a cover which is integral with a sleeve 18 the bore of which is arranged for the journal rotation of the other end of shaft 15.

Indeed, casing C (FIG. 7) is composed of two rings 19a identical with each other and having each two radial shells 17b, 20b which are diametrically opposed; the shells 17b of the two rings 19a are mounted together by bolts constituting the casing 17a referred to above, while the ends of the shells 20b have two standard half-clamps 21b which form, by the assembly of the two rings, a fixing clamp 21a on a sealing flange 22 of the casing E which insures the protection of the flywheel 5. Thus, the geometrical axis of the casing C is placed perpendicularly to the geometrical axis of the shaft 15.

In addition, each ring 19a has a wall 23 extending perpendicularly to the geometrical axis of the shells 17b, 20b and displaced sideways in relation to this geometrical axis to form a diametrical brace which supports two bearing cradles 24a, 25a; the geometrical axes of these two cradles being merged together and with that of the bearings to be mounted in the shells 17b, 20b.

Figure 6:
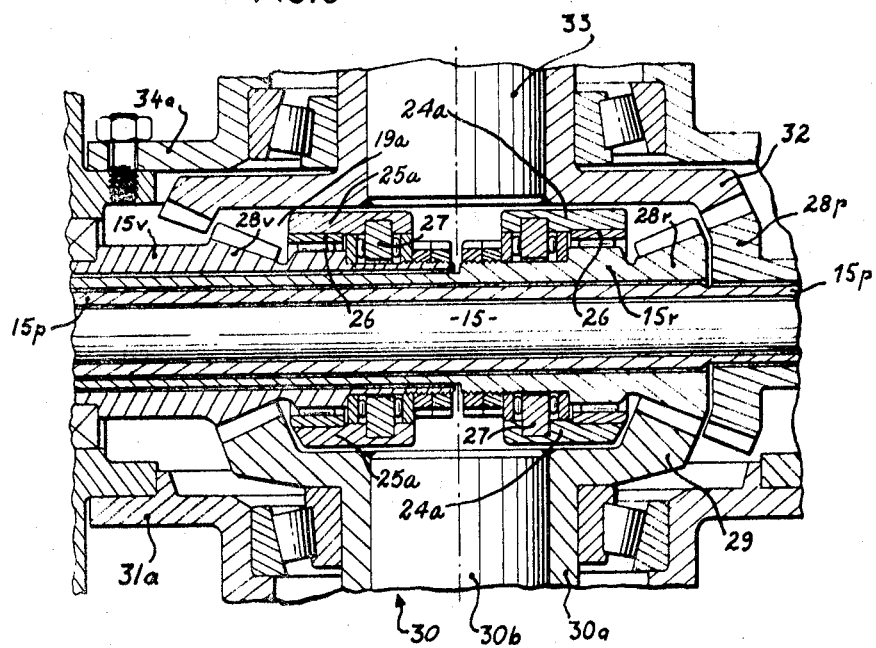
FIG. 6 represents, on a larger scale, a detail of FIG. 5.

In the bearing formed by the cradles 25a of the two rings 19a mounted together (FIG. 6) there are mounted a needle roller 26 and a stop 27 having two sets of needles to permit, respectively, the journal rotation of the tubular shaft 15v and the stability, in the axial direction, of this shaft against forces which may be applied to it. Similarly, the cradles 24a are provided with a needle bearing 26 and stops 27, identical with those of the cradles 25a, to support the outermost part of the tubular shaft 15r.

These shafts 15v, 15r are respectively equipped, in the vicinity of their bearings 26, 27, with taper pinions 28v, 28r, identical with each other, and drivingly engaging into the same toothed wheel 29 which is keyed on the outermost part of a first driven shaft 30, which is arranged perpendicularly to the axis common to the shafts 15 to 15r, and is associated, in rotation with the driving pulley 1m mentioned above. This shaft 30 is co-axially mounted, as will be explained hereinunder, in a rotation flared tube 31 having at one end a fixing collar 31a on the corresponding ring 19a.

In addition, the part of the shaft 15p, situated between the rollers 17 and the pinion 28r, is fitted with a taper pinion 28p engaged with a toothed wheel 32 integral with a second driven shaft 33, which is coaxially mounted, in the same manner as shaft 30, into a flared tube 34 identical with flared tube 31; this flared tube 34 being mounted co-axially with the tube 31, by means of it collar 34a, on the other ring 19a of the casing C.

Moreover, the shaft 15 (FIGS. 8a, 8b) consists in a tubular element in the bore of which there are welded in tight-seal manner, for example with the aid of a tin solder bath 15a, the three tubes 35p, 35r, 35v, of a bundle the ends of which are suitably plugged.

One of the ends of this shaft 15 has, in addition, a collar 15c permitting of its mounting, by means of screws, not shown, on the flywheel 5 flange; this collar 15c having three radial ducts 36p, 36r, 36v, spaced at an angle from one another and opening out each into the outermost part of a tube 35. Each of these ducts 36 of the collar 15c is designed to establish a communication with a duct 37p, 37r, 37v (only duct 37r is visible on FIG. 3) provided in flywheel 5 and in the peripheral portions of the crowns 12 with a view to supplying in correct manner, with a pressurized fluid, each of the chambers 7 of the three jacks 7, 8 described above.

The other end of the shaft 15, that which is engaged into the sleeve 18, has three radial holes 38p, 38r, 38v, which open out respectively in sealed manner into the tubes 35p, 35r, 35v and which are suitably spaced in relation to one another in a longitudinal direction to provide fluid communications with annular throats made in the bore of the sleeve 18 (FIG. 5). These throats may be supplied with fluid by pipes 39p, 39r, 39v, respectively connected, on the one hand, with the said throats and on the other hand with nozzles 40p, 40r, 40v of a slide-valve gear shown in FIG. 9.

This distribution gear consists in a cylinder body 41 having three parallel bores and suited to the axial sliding of three respective bar sections 42p, 42r, 42v which each have at their central part an annular groove 50 to constitute slides to which reference will again be made.

The bores of the slides 42r, 42v are identical with one another, and are paired in relation to the bore of the slide 42p, the axis of which is arranged in the plane of longitudinal symmetry of this distributor.

The length of the two slides 42r, 42v is appreciably greater than the depth of their bores and these two slides have, respectively on their outer portions, notches 43r, 43v for the engagement of a lever rod 44 hinged on a standard ball-and-socket joint which is not shown.

Obviously, such a lever makes it possible to actuate, in translation (arrows f), either of the two slides 42r, 42v; the body 41 being equipped with a standard bolting system having a latch 45 intended to slide transversely and arranged, for the "neutral" position of lever 44, facing notches 45a made in those slides. This standard system permits of the automatic bolting of one of these slides, in "neutral" position, by engagement of the latch 45 in the notch of this slide when the other slide is pushed into its bore under the action of lever 44.

The slide 42p may also be actuated by a standard fork 46a from the foot of a lever 46 having a standard joint 46b (FIG. 11), and it will be pointed out that the strokes of the three slides driven by the levers 44 or 46 are equal with one another.

Moreover, the body 41 has a recess 41a into which the inside ends of the three slides 42 may be shifted, and the corresponding end of the slide 42p is fitted with a latch 47 fitting a transversal groove 47a forming a notch which is provided on the outermost portion of the slide 42v; the outer end of this slide 42p have a handle 47 for engaging the latch permitting of the joining of the two slides 42p and 42v, by engagement of the latch 47 into its notch 47a.

Moreover, the above-mentioned nozzles 40p. 40r, 40v open out, respectively, into the bores of the slides 42p, 42r, 42v and, in each of these bores, two grooves 48, 49 are symmetrically provided on either side of the corresponding nozzle 40. It will be observed that the grooves 48, 49 of the bores of the paired slides 42r, 42v are, by virtue of the symmetrical arrangement of these two identical bores, opened one into the other, and in aperture 48a opens out into the part common to the grooves 48 to permit of a connection with a source of pressurized fluid having a pump which has not been shown.

In addition, an aperture 49a opens out, similarly, into the part common to the grooves 49 to permit of a connection with a discharge tank (not illustrated) which may form a supply tank for the above mentioned pump.

The grooves of the bore of slide 42p have also two openings identical with the openings 48a, 49a, to make it possible to effect, respectively, a supply from the source and a delivery towards the tank, mentioned above.

Moreover, the throats 50 of the slides 42p, 42r, 42v are identical with one another and their width e is suited to the spaces provided between the grooves 48, 49 and their nozzles 40, to constitute standard slides for the distribution of fluid between the pipes 40 and the source or tank of the latter.

The foregoing description makes it possible to understand that it is possible to actuate lever 44 to push back into the bottom of its bore the slide 42v, for example, and lock in the neutral position, the slide 42r; this operation has the effect of establishing communications between the source of pressurized fluid and pipe 40v, 39v; and between pipe 39r, 40r and the delivery tank.

In that way, the pressurized liquid may flow into the openings and ducts 35v, 36v of shaft 15, and then into the corresponding ducts of flywheel 5 to actuate the jack 7, 8 of the lining of disc 14v.

Simultaneously, as a result of the action of its washer 10, the jack 7, 8 of the lining of disc 14r has a tendency to discharge through duct 37r of flywheel 5, through those of shaft 15 and pipes 39r, 40r, towards the above-mentioned tank.

Thus, the tubular shaft 15v is engaged on shaft 4 of the motor to effect, through pinion 28v and toothed wheel 29, the rotation in a predetermined direction of the shaft 30 of pulley 1m and it will be understood that it is possible by similar actuation of lever 44, to disengage this shaft 15v and to engage, quite safely, shaft 15r to effect, in an opposite direction and in one and the same range of speeds, the rotation of pulley 1m.

Similarly, the handle 47m being arranged in the position of release of the latch 47 from its groove 47a, it is possible to atuate the lever 46 to effect engagement, on the driving shaft 4, of the shaft 15p which, by means of the pinion 28p and the toothed wheel 32, makes it possible to drive the other driving pulley 2m.

The engagement operations of the two driven shafts 30, 33 of the two driven pulleys 1m, 2m on shaft 4 of the motor may therefore be carried out independently of one another, but it is practical to associate, in translation, by means of latch 47, the two slides 42p, 42v to effect, in synchronization, the engagement of the shafts of the two pulleys 1m, 2m, in a predetermined direction of rotation.

Finally, it will be pointed out that for the pinions 28 and the toothed wheel with which they are engaged, dimensions were selected which permit a reduction of the speed of the driven shafts 30, 33 to a value perfectly suited to a good transmission by belts engaged on pulleys 1m, 2m.

Moreover, the pulley 1r connected by means of a belt 1c with the pulley 1m (FIG. 1) is mounted on a shaft 51 which is borne, parallel with the shaft 30, by bearings mounted on the frame B of the tractor.

In addition, chain pinions of two sets of pinions 52a, 52b and 53a, 53b are respectively keyed on the shaft 51 and mounted idle on a sleeve 54 for driving of the casing of a standard differential of the half-shafts of the driving wheel R of the tractor. It will be indicated that the ratio of the diameters of the pinions 52a, 52b is different from that of the pinions 53a, 53b to permit of two stages of speed which effect, in relation to each other, a speed difference at least equal to the speed range of the pulley variator; the change-over from one speed range to the other being effected by a travelling ratchet or pawl 55 which has, in addition, a "neutral point" permitting of the disengagement of the driving wheels R to facilitate, when the engine stops, manual displacements of the vehicle.

It will then be appreciated that the means for engagement and reversing mounted in the casings E and C of the transmission device may be, simultaneously, driven to insure in either direction the driving in rotation of the shaft 51 the speed of which may be adjusted within the continuous range of speeds of the regulable groove pulley device 1m, 1r.

Such a shaft 51 can, therefore, conveniently effect the driving, for example, of the driving wheels R of a tractor; in such a case the transmissions 52a, 52b–53a, 53b with two speed-change stages between that shaft 51 and the driving wheels R makes it possible to take into account the possibilities of variation or values of the speed range, of a pulley device of acceptable dimensions, on the one hand, and the values of the speed appropriate to the movement of the tractor on the road, and to agricultural work, on the other hand.

Similarly, the pulley 2r (FIG. 1) is mounted on a shaft 56 borne parallel with the shaft 33 by bearings mounted on frame B of the tractor; this shaft may be driven, in a manner similar to that of shaft 51, by the members housed in the casings E and C. This shaft 56 has, in addition, a grooved end-piece 56a constituting a transversal means of power take-off.

This shaft 56 may also, through a standard gear train 57, effect the drive in rotation in a single direction corresponding to those of shafts 4 and 15p, of the power take-off shaft 3 mentioned above.

Thus, the speeds of the vehicle and of the power take-off may, by the adjustment of the belt devices, be conveniently adapted to the values which are the most propitious for the harmony of the movement of a machine carried or pulled by a tractor, and of the working load imposed upon said machine. Moreover, these movements may be carried out entirely with driving wheels forward or at the rear, to take into account the pecularities of utilization of the machine, of the work or of movement on the road.

Finally, the shafts 51 and 56 are, advantageously, arranged coaxially along the extension of each other and an arrangement of pawls 58, the elements are respectively fixed on their facing outermost parts, makes it possible to couple these two shafts.

It will then be appreciated that the slides 42v, 42p of the slide-valve distributor 41 described hereinabove may be associated in translation by latch 47 to permit engagement drives, in the same direction of rotation, of the shafts 30 and 33 and, accordingly, of the shafts 51, 56; the synchronism of the speeds of the latter being ensured by a suitable adjustment of the grooved pulleys 1m, 2m.

Thus, it is possible to provide for each speed regulation device pulleys of dimensions reduced to a value which permits of a transmission, under good conditions, of part (approximately 66 to 75%) of the maximum power of the engine M and to use devices which all have a wider range of speeds. This maximum power may, then be transmitted entirely, under even better conditions, to the wheels R of the vehicle when the power take-off shaft 3 is not used and the shafts 51, 56 of the driven pulleys are associated by means of the pawl 58.

Moreover, it will be observed that by virtue of the position of the shafts 30, 33 perpendicular to the shaft 4 of the engine, the pulleys 1m, 1r and the belt 1c, for example, are arranged along a plane parallel with one of the sides of the emplacement of the engine M; the pulleys of those two devices for speed adjustment are therefore arranged along two planes parallel with each other, on either side of the engine emplacement, which permits of a reduced overall size of this transmission device.

In addition, the walls 23 of the rings 19a make it possible to arrange the bearings of the shafts 15v, 15r between the toothed wheels 29 and 32 of the driven shafts 30, 33, which is very favorable for the reduction of the overall size of the protection casing for the driving elements of these two driven shafts; these arrangements are, obviously, well suited to an adequately compact embodiment to be able to equip an usual tractor chassis.

Moreover (FIG. 5), each of the pulleys 1m, 2m (or 1r, 2r) of the two aforementioned speed variation devices has two circular flanges, with a face in the shape of a truncated cone 59, 60, which provide, between them, a throat of trapezoidal shape and a belt 1c (or 2c) the cross-section of which is adapted to that of the said throats and may effect a classical drive through the sides of the belt in contact with those of the said flanges.

It will be pointed out that the shaft 30 of the pulley 1m and the shaft 33 of pulley 2m are composed of identical elements, and only shaft 30 will be described in detail.

The flange 59 has a hub 59a the bore of which has longitudinal grooves adapted to ribs provided on the nose of the shaft 30 to permit a conventional mounting of this flange 59 upon said shaft; the latter being mounted in rotatable manner further to a usual, opposed arrangement of two taper roller bearings 31b, in the bore of the flared tube 31.

The shaft 30 is composed of a sleeve 30a into which one of the outermost parts of a mandrel 30b is forcibly engaged; the section of this part of mandrel being welded on the corresponding end of the sleeve 30a upon which the toothed wheel 29 of the transmission device is secured.

It will be observed that the length of the mandrel 30b is, very substantially, greater than that of the sleeve 30a, and that this sleeve had, beyond its forcible mounting part in this sleeve, a reduced diameter in relation to the internal diameter of the sleeve 30a to provide an annular housing co-axial shaft 30.

Furthermore, the free end of the bore of sleeve 30a has standard ribs which extend as far as an annular throat 30c; a sleeve 61, the dimensions of which are suited to those of the annular housing formed by the sleeve 30a and the mandrel 30b, is engaged in this housing. The outer end of the sleeve 61 has, indeed, ribs intended to slide freely in those of the sleeve 30a; these ribs make it also possible by a forcible fitting to mount the hub of the flange 60 on the outer end of this sleeve 61.

Moreover, a ring 61a, designed for a free sliding in the bore of sleeve 30a, is mounted on the inner end of this sleeve 61, while a ring 61b, similar to the ring 61a and designed for a free sliding of the free end of the mandrel 30b, is fixed on the outer end of the sleeve 61.

This mounting permits, through the above-mentioned ribs, on the one hand, of the rotation drive of the flange 60 and, on the other hand, the axial sliding of the latter in relation to the other flange 59; the end of the sleeve 61 fitted with the flange 60 being, always supported by the free end of the mandrel 30b.

Finally, the other driven pulley 1r consists of flanges permitting of a rotation drive and a relative axial sliding similar to those which have just been described; one of the flanges of this pulley being subjected to the action of a spring to be pushed, in usual manner, towards the other flange. Under the action of this push which has a tendency to spare the minimum opening of the throat of this pulley, tensile stresses are generated in the strands of the belt 1c which have a tendency to push apart the flanges 59, 60 of the driving pulley 1m.

This effect of opening of the throat of the driving pulley 1m is counterbalanced by the action of a jack 62, described hereinabove, which makes it possible to regulate, in known manner, the ratio of the speeds of shafts 30 and 51, respectively associated with those two pulleys.

This jack comprises, in fact, a tubular piston 62a assembled to the flange 59, coaxially with the axis of the shaft of the pulley, by fixing rods 63 suitably angularly placed in relation to each other and freely engaged in the holes of the flange 60 (one only of these rods is visible on FIG. 5).

This piston 62a is in the shape of a cylindrical bell the rim of which has a collar provided with a sealing joint 62b and arranged for sliding on the side wall of a cylinder 62c, which is mounted, by means of screws, on the outer face of the flange 60. The central portion of this cylinder is in the shape of a cylindrical cap constituting a housing for the relative axial displacement of the nose of the mandrel 30b.

Finally, this jack may be supplied with a pressurized liquid, by means of a system having an axial tube and an annular grooved sleeve 64 integral with the bell 62a and practically similar to the sleeve 18 of the supply ducts of the clutch jacks described above.

It will be understood that the protruding end of each mandrel 30b of these pulleys 1m, 2m prevents the overhanging of the sliding flange of conventional pulleys. This arrangement of the tubular elements of the mixed shaft 30 makes it possible, therefore, to reduce the length of these elements which leads to a reduction of the length of the flared tube 31.

This result is, obviously, favorable to a reduction of the overall size of the transmission arrangement; the belts of the two speed variators being thus able to be arranged as near as possible the sides of the emplacement of engine M.

Moreover, it will be observed that the ducts integral with the sleeves 64, for supplying the driving jacks 62 of the grooves of the drive pulleys 1m and 2m, may be connected to a conventional arrangement, not shown, having a cock which affords the free communications of the two jacks. Such a communication of the jacks leads to an equalization of the tension of the belts of those two pulleys and the synchronization of their transmission ratio when the two shafts 51, 56 of the driven pulleys 1r, 2r are coupled in rotation by the pawl 58, to transmit to the driving wheels R of the tractor the whole of the power of engine M.

Finally, it will be observed that these engagement and reversing devices, on the one hand, and the speed change device, on the other hand, are perfectly suited to the employment of conventional remote control means by a pressurized fluid; such remote control means being necessary for the employment of a movable driving seat, for various positions of the latter on tractors carrying various machines.

Moreover, the transmission chain alternative represented in FIG. 13 has also a limited overall size and permits of results of the transmission from one driving shaft to two driven shafts identical with those described above. Such an alternative has a three-plate clutch device housed in a casing E identical with that of FIG. 3; such a method of chain transmission can generate only, on the tubular shafts 15p to 15v, torsional stresses, so that the said shafts may be mounted in traditional ball bearings 65, suitably fixed in two walls integral with the cover of the casing E.

A pinion 66p is keyed onto the shaft 15p to drive a chain 67p which is engaged on a pinion 68p integral with a shaft 69 arranged parallel with the shafts 15; this shaft 69 is composed of members similar to those of shaft 30 described above, and is fitted with a driving pulley 70m similar to pulleys 1m, 2m.

In addition, two pinions 66r, 66v are respectively keyed on the tubular shafts 15r, 15v to drive two chains 67r, 67v which are, respectively engaged on pinions 68r, 68v secured to one same shaft 71 parallel with the shafts 15; this shaft 71 being, also, composed of elements similar to those of shafts 30 to drive another driving pulley with regulatable groove 72m, also similar to pulleys 1m, 2m.

It will be pointed out that the pinions 66p, 66r, 66v are identical with one another; the same applies to the pinions 68p, 68r, 68v; the ratio of the diameters of these pinions being suited to a good transmission output for grooved pulley and belt. In addition, the driving pinion of the chain 67v is engaged on the inner face, whereas the driving pinion 66r of the other chain 67r is engaged on the outer face of this chain 67r, by means of a conventional return roller 73 suitably mounted on one of the walls of the casing E.

This effects, within one and the same range of speeds, the reversal of the direction of rotation of the shaft 71.

In addition, it will be observed that the shafts 69 and 71 are advantageously co-axially arranged as an extension of each other, as near as possible to a longitudinal side of the emplacement of the engine M and that the belts, not shown, which may be engaged into the pulleys 70m, 72m extended, in parallel, with the two transversal sides of said emplacement.

Indeed, the elements 69a, 71a of those shafts, corresponding to the sleeve 30a of FIG. 5, are respectively borne by conventional ball bearings 73a, 73b which are mounted on parts of the casing C and the chassis B.

Moreover, a substantial part of the sleeve 69a is freely engaged in the bore of the sleeve 71a; the free end of each of these two sleeves being respectively borne by a needle bearing 74a or 74b which is suitably associated with the other sleeve. Obviously, the part of the sleeve 69a engaged in the sleeve 71a is sufficiently long to provide, between the two needle bearings 74a, 74b, a gap suited to a satisfactory rigidity of the unit thus borne by the bearings 73a, 73b.

In addition, the two pulleys 70m, 72m are respectively associated through belts with driven pulleys 70r, 72r, similar to the pulleys 1r, 2r mentioned above, to constitute two speed variators intended to entrain respectively in rotation a conventional power take-off pulley 75 and pinions 76 for chain transmission to the differential of the shafts of driving wheel of a raised platform chassis tractor, such as the one represented in FIG. 12.

These pulleys 70r, 72r are, in fact, mounted on shafts 77r, and 78r, respectively equipped with the pulley 75 and pinions 76 and borne, in conventional manner, by bearings 73c and 73d mounted on chassis members (the bearings 73c, 73d are visible on the cross-section parts of FIG. 13). It will be observed that these two shafts 77r, 78r are, also, coaxially arranged as an extension of each other and that the internal and external races of a roller bearing 74c are respectively mounted on the end of the shaft 78r and in a bore provided at the end of the hub of the pulley 70r. Moreover, a pawl arrangement 79 permits of their coupling, in rotation, in a manner similar to that permitted by the pawl 58 of FIG. 1.

Thus, pulley 75 of the power take-off may be arranged near the inside face of a leg of driving wheel J of said tractor to provide, through a belt 80, the correct drive, for example, of a combine harvester M.B. borne by said tractor; the two ends of this belt 80 being engaged on return rollers 81a, 81b which permit adjustments of levels of use of this machine M.B., through a horizontal articulation 82 provided, transversely, on the tractor chassis.

Moreover, the shaft line, thus formed by the shafts 77r, 78r, is arranged parallel with the line of the shafts 69, 71, as near as possible to the other longitudinal side of the emplacement of the engine M, and it will be understood that this method of transmission, by a chain, from a clutch and reversing device to two speed variation devices, through regulatable throat pulleys, is well suited to a transversal arrangement of an engine M on a chassis platform of such a tractor-carrier and that, accordingly, this platform may have in a longitudinal direction, a reduced dimension providing, above the drive wheels, an efficient clearance, for example, for the grain hopper T of a combine harvester M.B. (FIG. 12).

Finally, it will be understood that this alternative, the overall size of which is suited to the particular shape of such a chassis, may furnish transmission results identical with those mentioned above.

Naturally, the present invention is not limited to the terms of the foregoing description but, on the contrary, it includes all the alternatives within the reach of a man skilled in the art.

It is therefore wished to have it understood that the present invention is not limited in interpretation except by the terms of the following claims.

What is claimed is:

1. A device for the transmission of adjustable speed of the power of an engine to a system of driven shafts, notably those of the driving wheels and of the power take-off of a self-propelled vehicle, said device comprising a system of coaxial tubular shafts equipped with:

clutch means for at least two driven shafts on a drive shaft, means for reversing the direction of rotation of one at least of said driven shafts, and being characterised in that one at least of the driven shafts is coupled to a speed-variation means of the belt type and to two pulleys having adjustable grooves.

2. A device according to claim 1, characterised in that each of said speed variation means include a belt and driven and driving pulleys and that the two pulleys and the belt of at least one of the speed-variation means are arranged in a plane parallel to one of the sides of an engine emplacement.

3. A device according to claim 1, characterised in that the driving pulleys are controlled by hydraulic jacks equipped with means of communication with each other and that the shafts of the driven pulleys are mounted coaxially to one another and are equipped with means for coupling to each other.

4. A device according to claim 2, characterised in that the shafts of the driving pulleys are coaxial and, in part, mounted journalled one inside the other.

5. A device according to claim 2, characterised in that it comprises a casing constituted by two identical elements each having the form of a ring comprising two radial shells diametrically opposed and a wall having two bearing cradles coaxial with said shells, said cradles and shells permitting coaxial mounting of at least three tubular shafts.

6. A device according to claim 5, characterised in that each of the rings of the casing includes means for securing a flared tube for mounting a driving pulley shaft perpendicular to the line of shafts carried by the shells and cradles of the bracing member.

7. A device as defined in claim 1 characterized in that a driven coaxial shaft ($15v$, $15r$ or $15p$) is coupled to a shaft ($30$–$33$) having a driving pulley by means of a speed change means including a belt and a pair of regulatable grooved pulleys. Said coaxial driven shaft being coupled by speed reducing means ($28v$, $28r$, $29$–$28p$, $32$) to effect a reduction of the speed of the pulleys to a value suited to a good transmission by means of a belt.

8. A device as defined in claim 2 wherein a second driven shaft ($15v$, $15r$ or $15p$) is coupled to a second speed variation means of the belt type and to two regulatable grooved pulleys; the belts of said second speed variation means being arranged parallel to each other and at two opposite sides of the engine emplacement.

9. A device as defined in claim 1 characterized in that two coaxial driven shafts are respectively provided with a pair of taper pinions ($28v$, $28r$) conical in shape, diametrically engaged with a third pinion ($29$) conical in shape mounted on a shaft ($30$) having thereon a driving pulley of the speed variation means of the belt type; said driving pulley being arranged parallel to the coaxial driven shafts and disposed at one end of the engine emplacement (FIGS. 5, 6, 1, 2).

10. A device as defined in claim 1 characterized in that two coaxial driven shafts are respectively provided with a pair of toothed pinions ($66v$, $66r$) rotatably coupled to two toothed wheels ($68v$, $68r$) mounted on a shaft equipped with a driving pulley; one of said rotatably coupled pinions and wheels including an additional toothed wheel ensuring the reversing of the direction of the rotation of said driving pulley: said driving pulley being perpendicularly disposed to the coaxial driven shafts and at one end of the engine emplacement (FIG. 13).

11. A device as defined in claim 9 characterized in that at least a third coaxial driven shaft ($15p$) is provided with a conical pinion ($28p$) engaged with another conical pinion ($32$) mounted on the shaft of the driving pulley of a second speed variation means of the belt type; said pulley being disposed parallel to the said coaxial shafts and situated on one side of the engine emplacement at an end opposite to the end where said driving pulley is situated.

12. A device as defined in claim 10 characterized in that at least a third driven coaxial shaft is provided with a toothed wheel ($68p$) coupled to a second toothed wheel ($68p$) mounted on a shaft of a driving pulley of a second speed variation means; said pulley being disposed perpendicularly to the coaxial shafts and situated at an end opposite the end where the driving pulley of the first speed variation means is situated.

13. A device as defined in claim 9 characterized in that the driven pulley of the speed variation means is situated on one side of the engine emplacement, at an end opposite to that where is situated the driving pulley of said device.

14. A device as defined in claim 10 characterized in that the driving pulley of the speed variation means is situated, on one side of the engine emplacement, at an end opposite the end where is situated the driving pulley of said device.

15. A device for the transmission of the power of an engine to a system of driven shafts, particularly those of the driving wheels and of the power takeoff of an automotive vehicle including a mechanism for the engagement of the two driven shafts with a driving shaft comprising a support ($5$) capable of being mounted on the driving shaft ($4$) and provided with sets of annular jaws ($8$, $12b$) for the axial clamping of friction clutch discs ($14r$ . . . ); two clutch discs ($14r$ . . . ) cooperating with said jaws and mounted on tubular coaxial shafts ($15r$ . . . ) of a conventional system for reversing and driving in rotation a first driven shaft ($30$), said support being provided with at least one third set ($14p$) of axial jaws for a third clutch disc mounted on a shaft ($15p$) coaxial with the shafts ($15r$ . . . ) of the other two discs and the shaft of the third disc being associated in rotation, with a second driven shaft ($33$); at least one of the two driven shafts ($30$, $33$) being coupled to a speed change means.

16. A transmission device as defined in claim 15 wherein said speed change means consists of a pair of regulatable grooved pulleys ($1m$, $1r$–$2m$, $2r$); one being driven ($1r$) and one driving ($1m$); a belt ($1c$) in driving engagement with said pair of pulleys; means ($62$) for regulating the groove of one of said pair of pulleys and means for returning to a predetermined position the groove of said other of said pair of pulleys; said driving pulley being mounted on said driven shaft.

17. A transmission device as defined in claim 16 further comprising means for driving in rotation a driven shaft ($30$–$33$) provided with a driving pulley; said driving means being provided with toothed wheels ($28v$, $28r$, $29$–$28p$, $32$–$66$ to $68$) effecting said regulatable grooved pulleys with a speed suited to a good transmission by means of a belt.

18. A transmission device as defined in claim 17 wherein both driven shafts ($30$, $33$–$69$, $71$) are coupled to speed change means consisting of driving pulleys ($1m$, $2m$, $70m$, $72m$) and of belts arranged parallel with each other as near as possible to opposite sides of an engine emplacement.

19. A transmission device as defined in claim 18 wherein the driving pulleys are controlled by a system of hydraulic jacks ($62$) provided with means of communication between said jacks; the shafts of said driven pulleys being disposed coaxially and provided with means of coupling with one another.

20. A transmission device as defined in claim 18 wherein one of the shafts of said driving pulleys is partially tubular and wherein the shafts of said driving pulleys are coaxial and, in part, rotatably mounted one in the other.

21. A device as defined in claim 17 further comprising a casing intended to protect elements of the transmission device, said casing including two identical elements ($19a$, $19b$), each being in the shape of a ring having two radial shells ($17b$, $20b$), diametrically opposed, and a wall ($23$) having two bearing cradles ($24a$, $25a$), the said shells and the said cradles being suited to the coaxial mounting of shaft bearings.

22. A device as defined in claim 21 characterized in that each of the rings has means ($31$, $31a$–$34$, $34a$) for fixing a flaired tube for mounting a shaft perpendicular to the shaft line carried by the shells and the cradles.

23. A device as defined in claim 16 wherein one of the flanges of a driving pulley is integral with a shaft having an annular housing in which a sleeve integral with the other flange is able to slide axially, while the central mandrel of the said shaft extends axially beyond the first flange.

References Cited

UNITED STATES PATENTS

| | | | |
|---|---|---|---|
| 1,866,891 | 7/1932 | Jackson | 192—87.15 |
| 2,237,322 | 4/1941 | West | 74—15.2 X |
| 2,878,690 | 3/1959 | Capron et al. | 74—230.17 A X |
| 2,910,881 | 11/1959 | Warman, Jr. | 192—87.19 X |
| 2,924,995 | 2/1960 | Hubert et al. | 74—15.84 X |
| 3,370,485 | 2/1968 | Carawan | 74—230.17 A X |
| 3,521,731 | 7/1970 | Labat | 192—48.91 |

ALLAN D. HERRMANN, Primary Examiner

U.S. Cl. X.R.

74—230.17 A, 361; 192—21, 48.91, 87.15, 87.19